US008952828B2

(12) United States Patent
Kohlmeier-Beckmann et al.

(10) Patent No.: US 8,952,828 B2
(45) Date of Patent: Feb. 10, 2015

(54) SYSTEM FOR EVACUATING PERSONS FROM A VEHICLE

(71) Applicant: Airbus Operations GmbH, Hamburg (DE)

(72) Inventors: Carsten Kohlmeier-Beckmann, Hamburg (DE); Anja Niemeyer, Hamburg (DE); Fred Raszpir, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/924,158

(22) Filed: Jun. 21, 2013

(65) Prior Publication Data
US 2014/0009274 A1 Jan. 9, 2014

Related U.S. Application Data

(63) Continuation of application No. PCT/EP2011/006416, filed on Dec. 19, 2011.

(60) Provisional application No. 61/425,897, filed on Dec. 22, 2010.

(30) Foreign Application Priority Data

Dec. 22, 2010 (DE) .......................... 10 2010 055 704

(51) Int. Cl.
*G08B 3/00* (2006.01)
*A62B 3/00* (2006.01)
*B64D 25/14* (2006.01)

(52) U.S. Cl.
CPC .. *A62B 3/00* (2013.01); *B64D 25/14* (2013.01)
USPC .................. 340/691.6; 340/691.1; 340/691.3; 340/693.2; 340/425.5; 340/628

(58) Field of Classification Search
USPC ......... 340/628, 332, 425.5, 468, 691.1, 691.6
See application file for complete search history.

(56) References Cited

U.S. PATENT DOCUMENTS

| 3,463,915 | A | * | 8/1969 | Day ................................ 362/34 |
| 3,621,383 | A | * | 11/1971 | Rush et al. .................... 324/414 |
| 3,692,144 | A | | 9/1972 | Summer |
| 3,829,678 | A | * | 8/1974 | Holcombe ...................... 362/34 |
| 5,301,630 | A | * | 4/1994 | Genovese et al. ............. 114/375 |
| 5,335,180 | A | * | 8/1994 | Takahashi et al. ............ 701/117 |
| 5,343,375 | A | * | 8/1994 | Gross et al. .................... 362/248 |
| 5,572,183 | A | * | 11/1996 | Sweeney ....................... 340/332 |
| 6,150,943 | A | * | 11/2000 | Lehman et al. ............... 340/628 |

(Continued)

FOREIGN PATENT DOCUMENTS

| CN | 1062228 | 6/1992 |
| CN | 200976187 | 11/2007 |

(Continued)

OTHER PUBLICATIONS

International Search Report dated Apr. 27, 2012.

*Primary Examiner* — Daniel Wu
*Assistant Examiner* — Son M Tang
(74) *Attorney, Agent, or Firm* — Dickinson Wright PLLC

(57) ABSTRACT

A system for evacuating persons from a vehicle includes a light signal generating device, which is adapted to emit at least one visual light signal that indicates at least one preset escape route for at least one person to be evacuated.

12 Claims, 5 Drawing Sheets

(56) References Cited

U.S. PATENT DOCUMENTS

| | | | |
|---|---|---|---|
| 6,276,634 B1 * | 8/2001 | Bodle | 244/118.5 |
| 6,600,274 B1 * | 7/2003 | Hughes | 315/291 |
| 6,966,414 B2 * | 11/2005 | Zonneveld | 193/5 |
| 7,018,079 B1 * | 3/2006 | Franco-Vila et al. | 362/470 |
| 7,369,062 B2 * | 5/2008 | Stokes et al. | 340/945 |
| 7,573,396 B2 * | 8/2009 | Stokes | 340/693.2 |
| 7,641,149 B2 | 1/2010 | McDonald | |
| 7,800,511 B1 * | 9/2010 | Hutchison et al. | 340/691.1 |
| 8,077,017 B2 * | 12/2011 | Kennedy | 340/328 |
| 2002/0057204 A1 * | 5/2002 | Bligh | 340/691.1 |
| 2003/0218545 A1 | 11/2003 | Colberg | |
| 2005/0115794 A1 | 6/2005 | Zonneveld | |
| 2008/0012728 A1 | 1/2008 | Heym | |
| 2010/0193633 A1 | 8/2010 | Budinger | |
| 2011/0305031 A1 | 12/2011 | Riedel | |
| 2013/0120137 A1 * | 5/2013 | Lehmann | 340/524 |

FOREIGN PATENT DOCUMENTS

| | | |
|---|---|---|
| CN | 201348174 | 11/2009 |
| DE | 35 24 457 | 1/1987 |
| DE | 696 03 186 | 2/2000 |
| DE | 100 43 251 | 4/2002 |
| DE | 103 02 322 | 8/2004 |
| DE | 10 2004 031 700 | 1/2006 |
| DE | 10 2009 007 491 | 8/2010 |
| DE | 10 2009 009 187 | 8/2010 |
| EP | 1 365 369 | 11/2003 |
| EP | 1 538 079 | 6/2005 |
| WO | 02/074620 | 9/2002 |
| WO | 2010/097253 | 9/2010 |

\* cited by examiner

SYSTEM FOR EVACUATING PERSONS FROM A VEHICLE

CROSS REFERENCE TO RELATED APPLICATIONS

This application is a bypass continuation of PCT/EP2011/006416 filed Dec. 19, 2011 which is entitled to and claims the benefit of German Application No. DE 10 2010 055 704.8 filed Dec. 22, 2010, and U.S. Provisional Application No. 61/425,897, filed Dec. 22, 2010, the disclosures of each of which, including the specification, claims, drawings and abstract, are incorporated herein by reference in their entirety.

FIELD

The present invention relates to a system for evacuating persons from a vehicle.

BACKGROUND

When conveying persons out of a vehicle, in particular when transporting passengers in aircraft, it is necessary to provide emergency devices for emergency situations that enable the persons in the vehicle to be evacuated quickly and safely to an area outside of the vehicle. In particular it is necessary to provide emergency devices that indicate escape routes to the persons in the vehicle. These escape routes are ideally characterized by a high flow rate, at which the persons are evacuated via the escape route.

Aircraft passengers are evacuated through doors in the fuselage and via emergency chutes associated with the doors. Typically, the basis for modern evacuation scenarios is a maximum flow rate of 110 passengers per door of the aircraft within 90 seconds. If an evacuation of all passengers within 90 seconds has to be guaranteed and it is assumed that only 50% of all of the doors are available for evacuation, the passenger number in the case of a cabin designed with 4 door pairs is limited to 440 persons. An increase of the passenger number is possible only by means of a further door area comprising one or more additional doors. Such a further door area may however be undesirable because of the technical outlay, the cost and the weight.

On the other hand, experience has shown that currently used emergency chutes are in principle capable of dealing with flow rates of more than 110 persons per door and 90 seconds. A lack of orientation among the evacuating passengers may however lead to inhibited behaviour of the passengers. In particular, what may happen is that the passengers are hesitant about quickly stepping through an evacuation door, getting onto the emergency chute adjacent thereto and then quickly getting off the emergency chute. This may lead to a logjam of people and a slow-down of the flow of persons. It is therefore impossible to achieve a high flow rate.

In the document EP 1 365 369 B1 a light-emitting device for indicating an emergency exit is described, by means of which persons are warned of a hazardous situation and guided in the direction of the emergency exit. The device may be operated under normal conditions in a standby state and in the event of an emergency evacuation in an alarm state. In the standby state the device emits a continuous beam of low intensity light. In the alarm state the device emits a discontinuous beam of higher intensity light.

The document EP 1 538 079 B1 describes an emergency chute with lighting on fixed supports. The emergency chute comprises a plurality of inflatable posts, which extend from support parts of the emergency chute that are disposed laterally of the sliding surface. The posts on their ends have sources of illumination for illuminating the sliding surface.

SUMMARY

The underlying object of the present invention is to provide a system for evacuating persons from a vehicle, which in the event of an emergency evacuation is capable of helping to optimize the orientation of the persons being evacuated from a vehicle and to increase the flow rate, i.e. the number of persons to be evacuated from the vehicle per unit of time.

This object is achieved by a system for evacuating persons from a vehicle having features of attached claims.

The system according to the invention for evacuating persons from a vehicle comprises a light signal generating device, which is adapted to emit at least one visual light signal that indicates at least one preset escape route for at least one person that is to be evacuated. The light signal generating device generates a visual light signal that may be discerned by a person and that informs and/or instructs the person, in which direction or at which location the person may reach safety in a hazardous situation. Direction and location are determined by the escape route. In this case, the light signal indicates the escape route in such a way that the person intuitively understands when, in which direction and how he has to move along the escape route.

The system according to the invention may be used for example in/on a ship, a land vehicle, a train or an aircraft. It is however also conceivable for the system according to the invention to be used in immovable objects, such as for example in buildings (a cinema, residential building, school and the like).

The system according to the invention preferably comprises an evacuation door and an emergency chute extending from the evacuation door. The evacuation door represents a passage or a through-opening, through which the person to be evacuated has to pass in order to reach safety. The evacuation door may be for example an opening in a building wall, a door in the hull of a ship, in the body of a land craft or in the fuselage of an aircraft.

The emergency chute may be inflatable. In a non-inflated state the emergency chute may be folded up compactly and stowed in an area below, in and/or alongside the evacuation door. The emergency chute may comprise an inflation device with activating mechanism, an independent energy supply and/or gas cartridges, which is adapted to inflate the emergency chute upon actuation of a switch. The switch may be disposed in the region of the evacuation door and/or in the cabin of the vehicle, in particular in the cockpit of an aircraft or on the bridge of a ship. The switch may however also be actuated automatically, for example upon opening of the evacuation door after an emergency landing or in some other situation characterized by danger.

The emergency chute may comprise a support structure and a sliding surface. The support structure may be adapted to stabilize an inflatable emergency chute in the inflated state in a way that makes it possible to slide safely and without difficulty along the entire surface of the sliding surface without significant dipping or sagging of the sliding surface. The emergency chute may comprise rubber-like, in particular airtight woven fabric that is connectable by means of stitching, glueing and/or thermoplastic welding. The support structure may be configured in the form of two or more support tubes that are disposed laterally of the sliding surface and extend substantially over the entire length thereof. The emergency chute at the bottom end and/or top end may comprise further support tubes, which extend at right angles to the support tubes disposed laterally of the sliding surface and together with said support tubes form a frame-like border for the emergency chute. The support tubes of the support structure may rise above the sliding surface of the emergency chute in such a way that persons to be evacuated, as they slide along the emergency chute, cannot accidentally fall out of, or down from, the emergency chute.

The light signal generating device preferably emits a visual light signal that is easily discernible by a person to be evacuated. In a preferred manner the light signal is capable of being discerned clearly and distinctly by a person to be evacuated even in the event of strong smoke development or in the event of fire also from a great distance.

The light signal generating device is preferably adapted to emit the light signal in the form of an arrow, a target, a schematic representation of a hand with a finger extended, a schematic representation of a person running and/or a dotted line. However, any other representation that may be intuitively interpreted by a person to be evacuated as clear orientation information and/or a clear instruction is equally possible.

The light signal generating device may further be adapted to emit the light signal in any desired colour, with any desired signal strength and/or in any desired direction. The colour preferably lies in the range visible to the human eye. It may be for example white, green, red, blue or yellow and is for example clearly distinguishable from the colour effect of the area surrounding the light signal generating device and/or the light signal. However colours in the infrared or ultraviolet wavelength range (for example black light for stimulating luminescence) are also conceivable. The signal strength of the light signal may be characterized for example by a light quantity, a luminance and/or an intensity of the light signal. The signal strength output by the light signal may be markedly above or below the signal strengths output by other light sources in the area surrounding the light signal generating device and/or the light signal. The signal strength may be characterized for example by a light quantity of 100 lumen, with the result that the light signal does not cause the person in the vehicle any unpleasant impairment or disturbance. The signal strength may however also be characterized for example by a light quantity of 1500 lumen, with the result that the light signal is clearly discernible by the persons in the vehicle. The signal strength may however also be characterized by a light quantity of less or more than 100 or 1500. The direction may cover the entire solid angle (as in the case of a diffuse light signal) or be oriented.

It is also conceivable that the light signal generating device may emit a light signal of a changing colour, light quantity and/or direction. This change may be time-dependent. For example, the change may occur periodically in respect of time.

The light signal generating device is preferably adapted to generate the light signal by converting electric power to light output. In other words, the light signal generating device may actively generate the light signal. For this purpose, the light signal generating device may comprise an energy source, for example in the form of a battery, an accumulator or a feeder of electrical energy from any desired electric power system. The light signal generating device may further comprise a light source, for example in the form of one or more incandescent lamps, one or more gas discharge lamps, one or more light-emitting diodes, one or more lasers, one or more data projectors, one or more spotlights, one or more reading lamps and/or one or more projectors.

It is self-evident that each light signal may be generated by means of a single light source. It is however also conceivable that two or more light signals may be generated by one and the same light source. Thus, for example the light signal generating device in the form of a laser, a projector, a data projector or a luminaire array may generate a pattern of a plurality of light signals, which may be displayed dependency or independently of one another in different or identical shapes, colours and/or intensities. A pattern of light spots may be generated for example by interference (for example diffraction) of coherent light radiation (for example laser light).

Also possible, however, is a passive generation of the light signal by means of the light signal generating device. The light signal generating device may therefore comprise luminous means that generate the light signal after they are activated. For example an activation of the luminous means may be activated chemically, thermally and/or by illuminating with light that originates for example from the light signal generating device itself and/or from another light source. The luminous means may also deflect, diffuse, intensify and/or maintain the light signal. The luminous means may further comprise reflectors, retro-reflecting or luminescent substances. By luminescence may be meant i.a. chemical luminescence, fluorescence, phosphorescence, photoluminescence or the like. Naturally the function of the light signal generating device may also be based on a combination of active and passive generation of the light signal. The retro-reflecting substances may reflect light directionally or diffusely.

It is further possible for the light signal generating device to be adapted to generate the light signal by projecting at least one object or at least one object image onto an image plane. For this purpose the light generating device may comprise a mapping system that maps the light signal from an object location (for example at the location of a light source) onto an image location. Object location and image location may therefore be situated with clearance at two positions that are different from one another, in particular remote from one another. This enables a separation of the light signal generation location from the light signal display location. In particular the light signal generating device may generate a light signal in the form of an oriented, focussed and/or collimated light beam. The image plane may correspond to a cabin floor, a cabin wall, a cabin ceiling, the floor in the region of an evacuation door, any other desired cabin inner region and/or cabin outer region, the sliding surface of an emergency chute and/or the surface of a landing strip, a railway platform and/or a quayside. The image plane may however also correspond to the surface of a body part of another person. In particular the image plane may correspond to a surface on the back of a person to be evacuated, who is situated in front of another person to be evacuated.

The light signal generating device may moreover comprise a control device, which is adapted to change the shape, colour, light quantity and/or direction of the light signal in a time rhythm that is adjusted to a preset flow rate of persons to be evacuated via the escape route. The light signal may therefore be interpreted as a clock generator that for a person to be evacuated defines a cycle in terms of when (at which instant) and how (for example leaving which defined gap relative to another person moving in front) the person has to move at least along a specific section of the escape route. The indication of the escape route by means of such a light signal with a clock generator function is advantageous particularly at points of the escape route where there are bottlenecks, at which a potential risk of congestion is to be expected, such as for example at an evacuation door, at a top end of an emergency chute that comprises the point of entry to the emergency chute, and/or at a bottom end of an emergency chute, where persons evacuated by means of the emergency chute leave the emergency chute via an exit point. The cycle may define for example a preset instant for a person to jump down from the evacuation door onto the emergency chute in order to guarantee a specific flow rate. The flow rate may comprise for example a value of 110 persons per 90 seconds, but also a lower value (for example 100 persons per 90 seconds) or a higher value (for example 120 persons per 90 seconds). If desired, the cycle defined by the light signals of the light signal generating device according to requirements, i.e. situation-dependently, for example with the aid of a corresponding control unit.

The control unit may further be adapted to operate the light signal generating device in at least a first operating state, at least a second operating state and/or at least a third operating state.

The first, second and/or third operating state may represent a standby state and be used for normal operation, during which persons in the vehicle are not in danger. The first, second and/or third operating state may however also represent an alarm state and be used to indicate a hazardous situation, in which the persons in the vehicle are to be alerted that in the context of an emergency evacuation they are to make their way to the evacuation door. The first, second and/or third operating state may further represent an enabling state in a situation, in which it is to be indicated that the evacuation door and the emergency chute extending from it may be used safely and without hindrance.

The light generating device may be operated exclusively in the first, second or third operating state. The light generating device may however also be operable, if need be, in the first, second and/or third operating state. In the first operating state the light generating device may emit a light signal of a first shape, a first colour and a first time-dependent light quantity in a first direction. In the second operating state the light generating device may emit a light signal of a second shape, a second colour and a second time-dependent light quantity in a second direction. Finally, in the third operating state the light source may emit a light signal of a third shape, a third colour and a third time-dependent light quantity in a third direction.

The first, second and/or third colour may be identical or different. The first, second and/or third colour may differ for example in their signal effect that persons experience. The first, second and/or third light quantity may be identical or different. The first light quantity may be for example lower than the second and third light quantity, and the second light quantity may be for example lower than the third light quantity. The time dependencies of the first, second and/or third light quantities may be constant over time or may change over time periodically with in each case identical or different frequencies. The first, second and/or third direction may be identical or different. The light quantity of the light signal may be interpreted as a measure of how brightly and/or distinctly a person to be evacuated discerns the light signal generated by the light quantity.

The light signal generating device may comprise an acquisition device, which is connected to the control device and adapted to acquire at least one input signal that is characteristic of the negotiability of the evacuation door and/or the emergency chute, wherein the control device may further be adapted to receive the input signal acquired by the acquisition unit and to operate the light generating device in dependence upon the input signal in the first, second and/or third operating state. The acquisition device may comprise a manually actuable switch, upon the actuation of which for example by the on-board personnel the evacuation door and/or the emergency chute is enabled as negotiable. The acquisition unit may comprise for example a sensor for measuring the input signal. The input signal may be a signal that is characteristic of a state, in which the emergency chute has been inflated correctly. The signal may however also be characteristic of the activation of an inflation mechanism of the emergency chute and/or of the opening of a door. The acquisition unit may comprise a plurality of input signals and may operate these with "AND", "NAND", "OR" and/or "NOR". For example the acquisition device may be adapted to give a switch or a sensor such a priority that only the input signal of the switch or sensor is relevant to the operating state of the light generating device and other input signals are ignored.

Finally the light signal generating device may also be adapted to emit a light signal in the region of a dividing device that divides a chute into a first slideway and a second slideway and extends substantially over the length of the emergency chute. The light signal may therefore indicate a first escape route and a second escape route that is usable independently of the first escape route, wherein the first and the second escape route lead via the same emergency chute. The light signal is preferably designed in such a way that a person who has to use the emergency chute is clearly given to understand that the emergency chute comprises two slideways, which are separate from one another and may be used independently of one another, simultaneously and/or in parallel by two lines of persons that are to be evacuated.

The dividing device is preferably configured as a geometric elevation. The dividing device may be configured in a way that prevents the paths of motion, which are described by two persons during parallel use of the emergency chute, from crossing over. The dividing wall preferably guarantees that the emergency chute also actually offers two escape routes that do not overlap with one another. For example the dividing device may be configured in the form of a bead-shaped support tube, which is integrated into the emergency chute and inflatable jointly with the emergency chute.

The light signal generating device for the purpose of light signal generation may comprise in the region of the dividing device a row of light-emitting elements disposed along the dividing device. For example the light-emitting elements may comprise a plurality of signal lamps. Alternatively a chain comprising a plurality of successively arranged light-emitting diodes is conceivable. The light-emitting elements may be spaced apart from one another or disposed close to one another. Preferably the light signal generating device generates a light signal that is periodically interrupted or appears continuous substantially from the top end to the bottom end of the emergency chute. In particular the light signal extends from a point at the level of the entry point of the emergency chute to a point at the level of an exit point of the emergency chute. The light signal generating device is preferably incorporated into the skin of the emergency chute. In particular it is conceivable for the light signal generating device to be attached by glueing, stitching and/or welding to the emergency chute.

The light signal generating device is preferably adapted to display a first light signal in a region of a lintel and/or a sill of an evacuation door, through which a first escape route leads, wherein the first light signal indicates a first direction that is adjusted to the direction of the course of the first escape route. The light signal generating device may further be adapted to display the first light signal in a region of a top end of an emergency chute, via which the first escape route leads, wherein the first light signal indicates a first position that is adjusted to a preset first entry point of the emergency chute. Finally the light signal generating device may be adapted to display the first light signal in a region that extends from the bottom end of the emergency chute in a direction leading away from the emergency chute, wherein the first light signal indicates a first direction that is adjusted to the direction of the course of the first escape route. The light signal generating device for this purpose may itself be disposed in the region of the lintel and/or the sill of the evacuation door and/or in the region of the top end and/or the bottom end of the emergency chute. The first and/or second light signal may be emitted on the near side and/or on the far side of a dividing device disposed on the sliding surface of the emergency chute.

The region of the sill of the evacuation door is for example the floor region in front of, in or beyond the evacuation door, at which the person to be evacuated moves along the escape route towards, through and/or away from the door. The region of the sill of the evacuation door may be for example a cabin vestibule or cabin aisle that adjoins the evacuation door in a vehicle body. The region of the sill preferably comprises a point of the escape route, from which a person to be evacuated, as he moves along the escape route, jumps down in order to land on an emergency chute, which is associated with the evacuation door and via which the escape route continues.

The region of the lintel of the evacuation door may be the upper delimitation of a door aperture, such as for example the overhead portion of the door frame. The lintel may however also comprise the lateral region of the door frame or door jamb of the evacuation door. The light generating device is preferably situated at least partially inside the vehicle. It may however also be situated at least partially outside of the vehicle.

The region of the top end of the emergency chute may be for example a region that comprises the region of the emergency chute where the emergency chute adjoins the vehicle. The region of the top end of the emergency chute may however also be a region that comprises a first portion of the sliding surface of the emergency chute that faces the vehicle. The first portion and a second portion of the sliding surface that is remote from the vehicle and does not overlap the first portion may make up the total sliding surface. The ratio between the length of the first portion and the length of the second portion may be for example 1:2 or 1:3. The length of the first portion may however also correspond to half, one times or two times the average distance that a person can jump from a standing position.

The region of the bottom end of the emergency chute may be for example a region of the emergency chute, in which the emergency chute adjoins a landing strip, a railway platform or a quayside. The region of the bottom end of the emergency chute may in particular entirely or partially comprise support tubes of a support structure of the emergency chute. In particular the region of the bottom end of the emergency chute may also comprise the lateral delimitation of the sliding surface.

The light signal generating device may further be adapted to display a second light signal in a region of a lintel and/or a sill of an evacuation door, through which a second escape route leads, wherein the second light signal indicates a second direction that is adjusted to the direction of the course of the second escape route. The light signal generating device may further be adapted to display the second light signal in a region of a top end of an emergency chute, via which the second escape route leads, wherein the second light signal indicates a second position that is adjusted to a preset second entry point of the emergency chute. Finally the light signal generating device may be adapted to display the second light signal in a region that extends from the bottom end of the emergency chute in a direction leading away from the emergency chute, wherein the second light signal indicates a second direction that is adjusted to the direction of the course of the second escape route.

The light signal generating device is preferably adapted to display the first light signal and second light signal side by side, wherein the first escape route indicated by the first light signal and the second escape route indicated by the second light signal lead through the same evacuation door or via the same emergency chute and are usable independently of one another. In other words, the light signal generating device emits a first and second light signal in such a way that for a person to be evacuated it is clearly evident that two independent escape routes lead through the one evacuation door and via the one emergency chute and may be used simultaneously and/or in parallel by two lines of persons to be evacuated. The light signal generating device may display the first and second light signal side by side in such a way that both signals are disposed substantially at the same height of the first and second escape route. The first and second light signal are preferably spatially separate from one another, i.e. they do not overlap.

It is further possible for the control device of the system according to the invention to be adapted to change the light quantities of the first and second light signal synchronously or asynchronously relative to one another. For example the time dependency of the light quantity of the first light signal may have a first frequency and the time dependency of the second light signal may have a second frequency, wherein the first and second frequency are identical but in phase opposition. It is further conceivable that the time-dependent characteristic of the signal strength of the first light signal that is perceived by a person to be evacuated corresponds to a time-dependent stepped function and changes periodically between a minimum value of the signal strength and a maximum value of the signal strength of the first light signal. The time interval corresponding to a period may comprise a first time interval portion and a second time interval portion. The duration of the time interval may in particular correspond to the total duration of the first and second time interval portion. The first and second time interval portion may differ in length. During the first and/or second time interval portion the maximum value and/or the minimum value of the light quantity of the first light signal may be emitted. The ratio of the first time portion to the second time portion may be for example 1:10 or 1:100. The first and second light signal may be displayed alternately to one another. In this case the feeling may be conveyed to a person to be evacuated that the first and second escape route in the region of bottlenecks are to be used according to the alternate merging method.

BRIEF DESCRIPTION OF DRAWINGS

There now follows a detailed description of embodiments of the present invention with reference to the accompanying figures, which show FIG. 1 a schematic representation of a first embodiment of a system for evacuating persons from an aircraft, FIG. 2 a schematic representation of a second embodiment of a system for evacuating persons from an aircraft, FIG. 3 a schematic representation of a third embodiment of a system for evacuating persons from an aircraft, FIG. 4 a detail view of a light signal generating device of the system of FIG. 1, FIG. 5 a schematic representation of the light signal generating device of the system of FIG. 1

DETAILED DESCRIPTION

Figure 1:
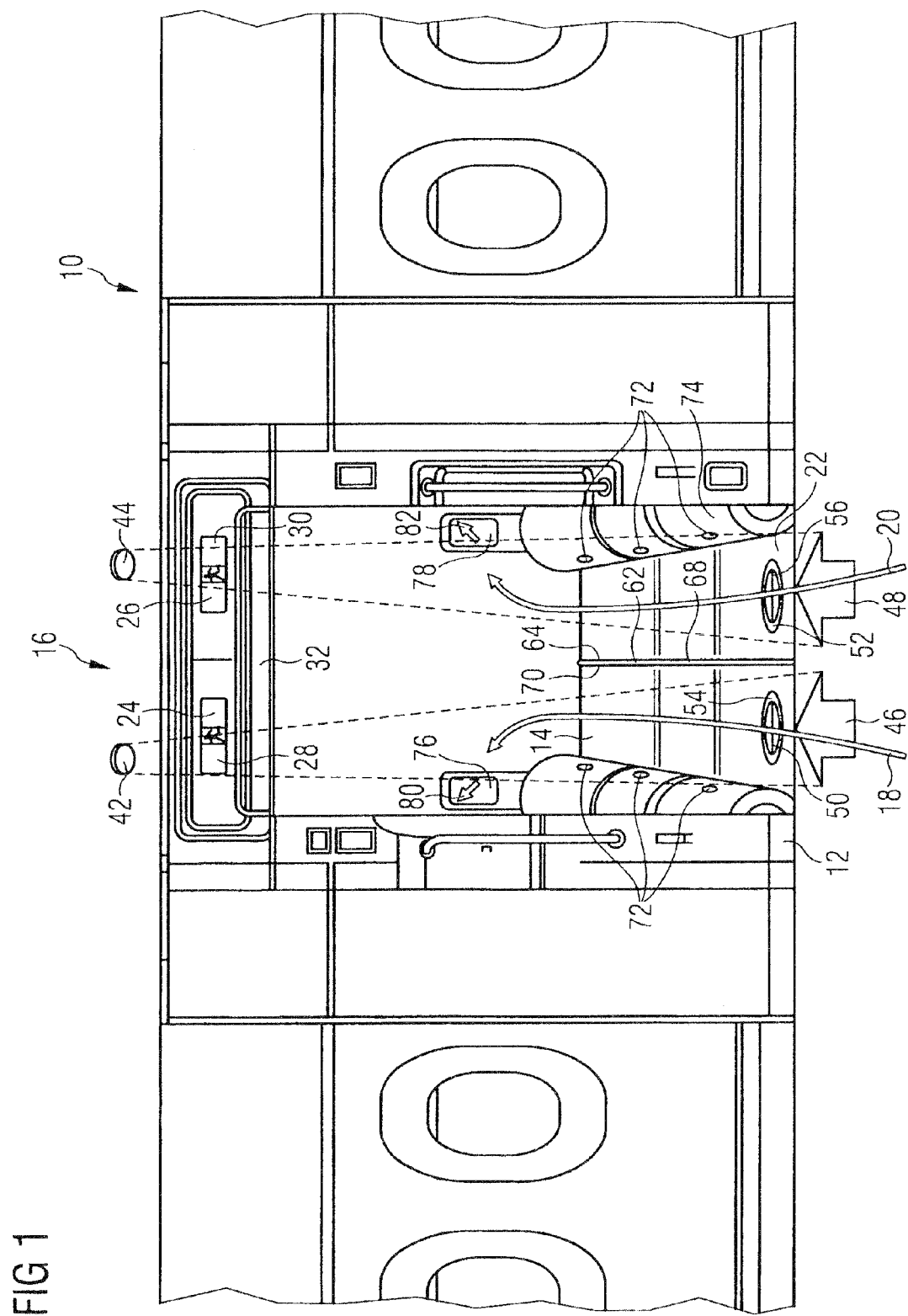

FIG. 1 shows a first embodiment of a system 10 for evacuating persons from an aircraft. The system provides measures for optimizing and increasing the flow rate of persons to be evacuated in the event of an emergency evacuation through an evacuation door 12 and via an emergency chute 14.

The system comprises an evacuation door 12, from which an emergency chute 14 extends. The emergency chute 14 comprises an inflation device (not represented), which is adapted upon activation to inflate the emergency chute 14. The measures for optimizing the flow rate through the evacuation door 12 and via the emergency chute 14 are to provide a person who is to be evacuated with information and/or instructions about how he is to pass through the evacuation door 12 and how he is to use the emergency chute 14.

The system 10 provides the information and/or instructions with the aid of a light signal generating device 16, which emits a plurality of visual light signals that indicate a preset first escape route 18 and a preset second escape route 20, which is usable independently of the first escape route 18, for one or more persons who are to be evacuated. The course of the first and second escape route 18, 20 is represented in FIG. 1 by two arrows. The first and the second escape route 18, 20 in this case lead side by side through the evacuation door 12 and via the emergency chute 14 adjoining the evacuation door 12.

If a person to be evacuated follows the first escape route 18, he passes through substantially a first half of the total area of the through opening of the evacuation door 14 and slides substantially over a first half of the sliding surface 22 of the emergency chute 14. If on the other hand the person follows the second escape route 20, he passes substantially through the second half of the total area of the through opening of the evacuation door 14 and slides substantially over the second half of the sliding surface 22 of the emergency chute 14.

The light signal generating device 16 comprises a first information light signal generating device 24 and a second information light signal generating device 26. The first information light signal generating device 24 generates a first information light signal 28. The second information light signal generating device 26 generates a second information light signal 30. The first and second information light signal generating device 24, 26 are disposed side by side in each case in a region of the lintel 28 of the evacuation door 12. As may be seen in FIG. 1, the first information light signal generating device 24 is situated above a through region of the evacuation door 12 that is associated with the first escape route 18. The second information light signal generating device 26 is situated above a through region of the evacuation door 12 that is associated with the second escape route 20.

The information light signals 28, 30 emitted by the first and the second information light signal generating device 24, 26 are substantially identical but, because the first and second information light signal generating devices 24, 26 are arranged laterally offset relative to one another, indicate to a person to be evacuated that it is possible for two persons who are to be evacuated to pass simultaneously and side by side through the evacuation door 12. The first and the second information light signal generating device 24, 26 therefore inform the person to be evacuated that not only the first escape route 18 but also the second escape route 20 running alongside the first escape route 18 lead through the evacuation door 12.

Figure 4:
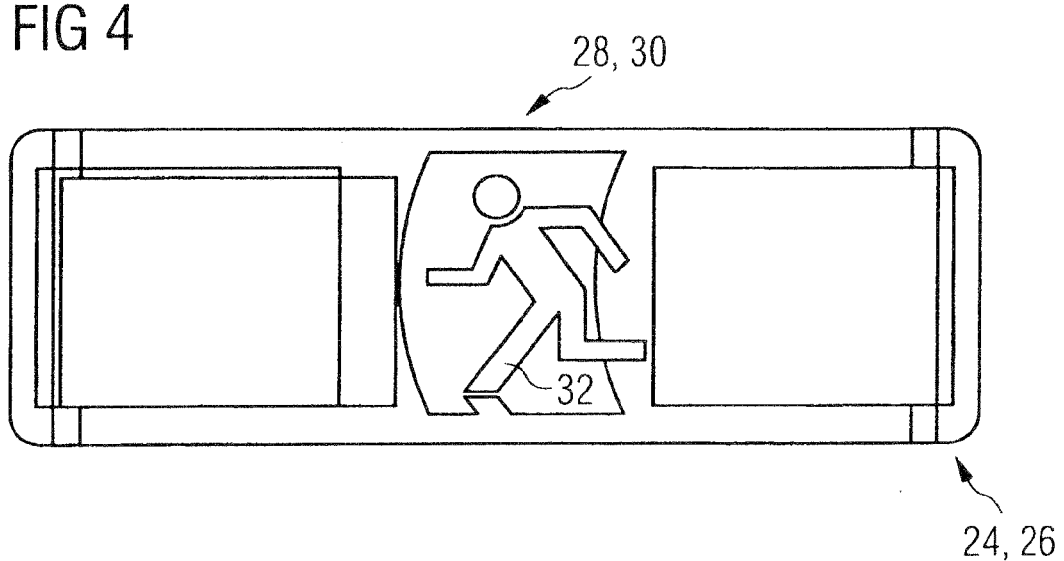

A schematic representation of the first or second information light signal generating device 24, 26 is shown in FIG. 4. In this case the first and/or second information light signal 28, 30 comprises a pictograph 32, which is printed or glued onto the first and/or second information light signal generating device 24, 26 and on which a schematic representation of a person hurrying through an opening may be seen.

Figure 5:
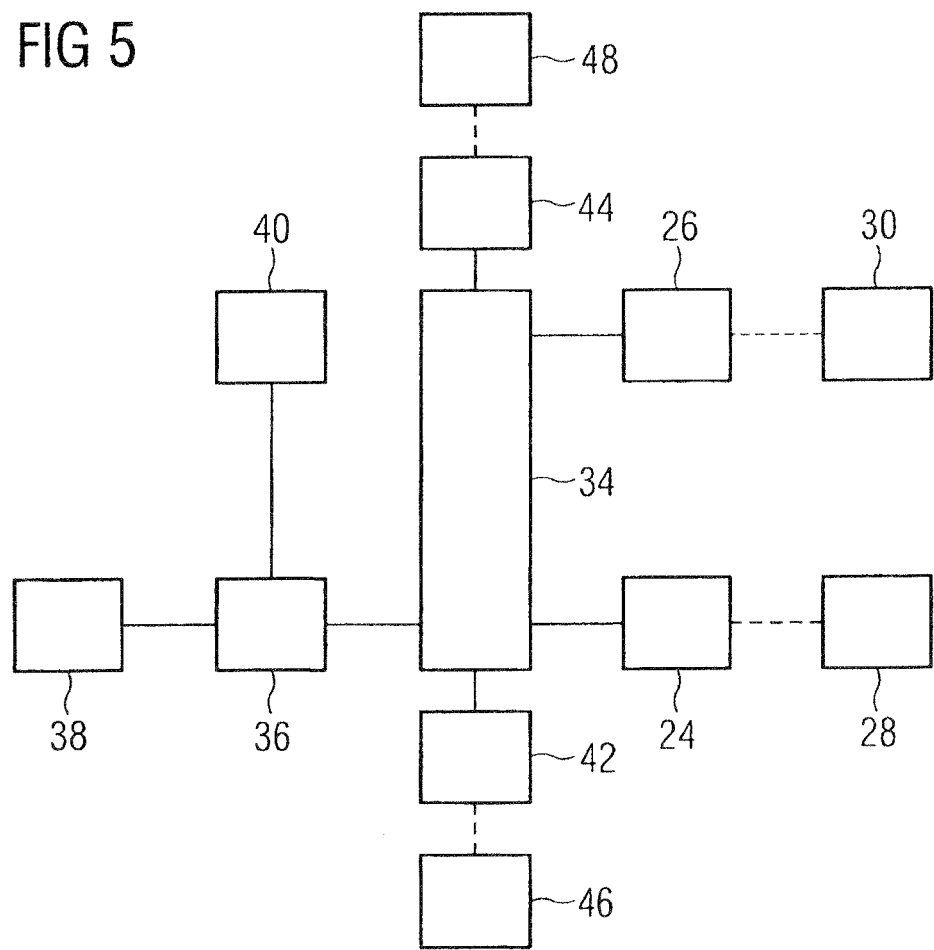

FIG. 5 shows a schematic representation of the first and second information light signal generating device 24, 26 and the first and second information light signals 28, emitted thereby. The light signal generating device 16 comprises a control device 34, which may operate the first and/or second information light signal generating device 24, 26 in a first, second and/or third operating state.

The first operating state is a standby state and is used during normal operation when the persons in the aircraft are not in danger. In the first operating state the first and second information light signal 28, 30 are in each case green in colour and light up in each case with a first luminance that is constant over time. So long as there are persons on board the aircraft, the control device 34 operates the first and second information light signal generating device 24, 26 in the first operating state. The second operating state is an alarm state and is used to indicate a hazardous situation, in which the persons in the aircraft are to be alerted that in the context of an emergency evacuation they are to make their way to the evacuation door 12. In the second operating state the first and second information light signal 28, 30 are in each case green in colour and light up in each case with a second luminance that is constant over time. The second luminance is markedly greater than the first luminance. For example the ratio of the first to the second luminance is 1:10 or 1:100. The third operating state is an enabling state and is used in a situation, in which it is to be indicated that the evacuation door 12 and the emergency chute 14 extending therefrom may be used safely and without hindrance. In the third operating state the first and second information light signal 28, 30 are in each case green in colour and light up in each case with a third luminance S', S" that varies periodically in a flashlike manner.

Figure 6:
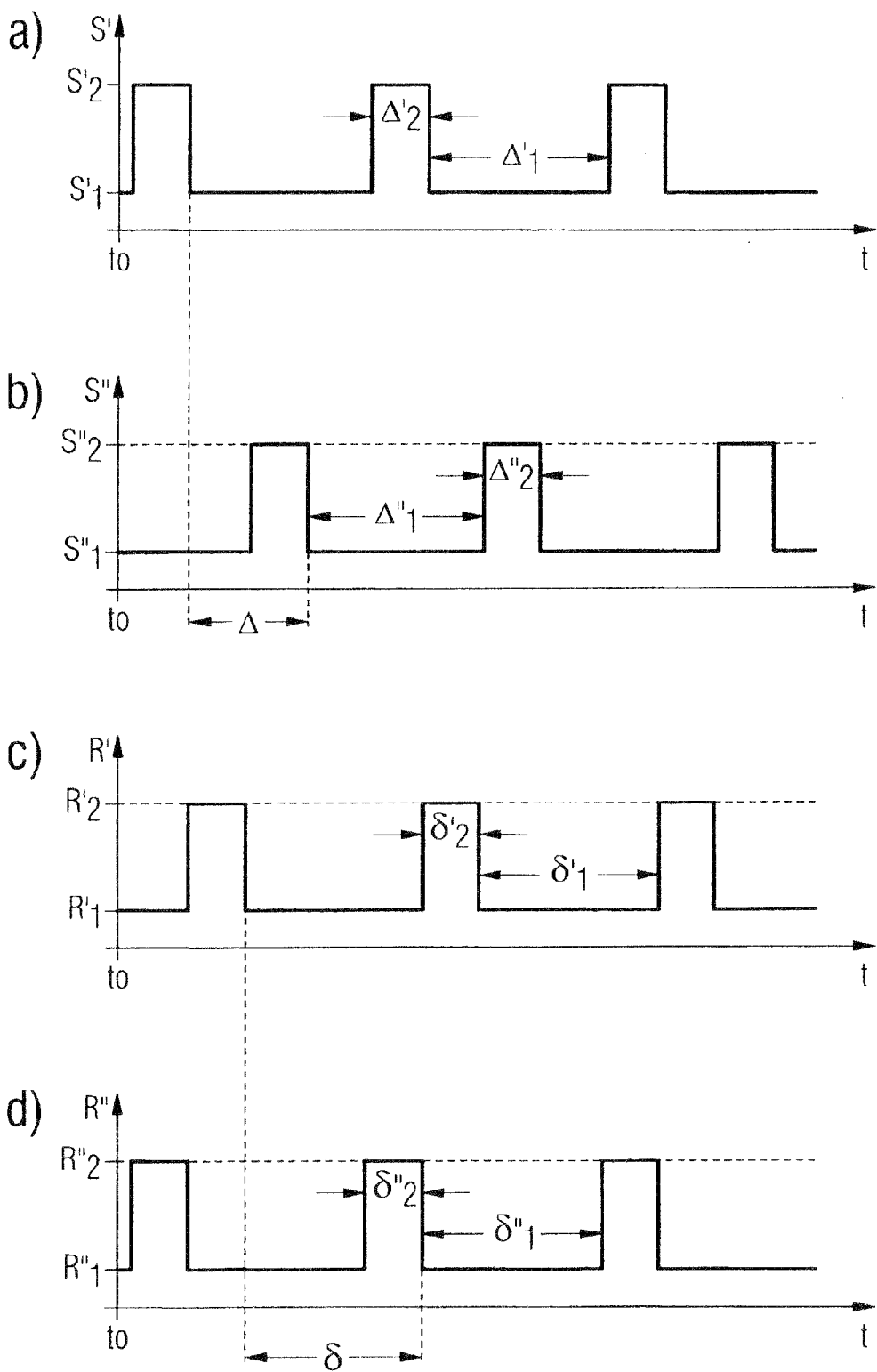
FIG. 6a a schematic representation of the time characteristic of a signal strength of a first light signal emitted by the light generating device of the system of FIG. 1, and FIG. 6b a schematic representation of the time characteristic of a signal strength of a second light signal emitted by the light generating device of the system of FIG. 1, and FIG. 6c a schematic representation of the time characteristic of a signal strength of a third light signal emitted by the light generating device of the system of FIG. 1, and FIG. 6d a schematic representation of the time characteristic of a signal strength of a fourth light signal emitted by the light generating device of the system of FIG. 1.

The third luminances S', S" of the sign, represented in FIG. 4, of the first and second information light signal generating device 24, 26 are modulated over time in the third operating state. The modulations of the third luminances S', S" follow substantially the shape of square-wave pulses. The time-dependent modulation of the luminance S' generated by the first information light signal generating device 24 is represented in FIG. 6a. The third luminance S' changes periodically between a minimum value S' i of the third luminance S' and a maximum value S'$_2$ of the third luminance S'. The period corresponds to a time interval $\Delta$'I+$\Delta$'$_2$ and corresponds for example to a duration of one second. The third luminance S' during the time interval $\Delta$'I assumes the minimum value S' i and during the time interval $\Delta$'$_2$ assumes the maximum value S'$_2$. The time interval $\Delta$\ is far greater than the time interval $\Delta$'$_2$. The ratio of the time interval $\Delta$'I to the time interval $\Delta$'$_2$ is for example 10:1 or 100:1.

The time-dependent modulation of the luminance S" generated by the second information light signal generating device 26 is schematically represented in FIG. 6b. The third luminance S" changes periodically between a minimum value S"i of the third luminance S" and a maximum value S"$_2$ of the third luminance S". The period corresponds to a time interval Δ"I+Δ'2 and corresponds for example to a duration of one second. The third luminance S" during the time interval Δ"I assumes the minimum value S"i and during the time interval Δ"$_2$ assumes the maximum value S"$_2$. The time interval Δ'I is far greater than the time interval Δ"$_2$. The ratio of the time interval Δ"I to the time interval Δ"$_2$ is for example 10:1 or 100:1. The time interval Δ'I+Δ'2 corresponds to the time interval Δ"I+Δ"$_2$.

As may further be seen in FIG. 5, the signal generating device 16 further comprises an acquisition device 36, which is connected to the control device 34 and by means of which an input signal that is characteristic of the negotiability of the evacuation door 12 and the emergency chute 14 is acquired and transmitted to the control device 34. The control device 34 in dependence upon the input signal operates the first and second information light signal generating device 24, 26. The acquisition device 36 for this purpose is connected to a door logic. The acquisition device 36 comprises a measuring sensor 38, which as an input signal measures a signal that is characteristic of the activation of the inflation mechanism of the emergency chute 14. If such an input signal is acquired, the control device 34 operates the first and second information light signal generating device 24, 26 in the first and third operating state. The acquisition device 36 further comprises a manually actuable switch 40, upon the actuation of which the evacuation door 12 and the emergency chute 14 may be classified as negotiable or non-negotiable. If as a result of actuation of the switch 40 the evacuation door 12 or the emergency chute 14 is classified as non-negotiable, the control device 34 operates the first and second information light signal generating device 24, 26 only in the first and/or in the second operating state, not however in the third operating state.

As may be seen in FIG. 1, the light signal generating device 16 further comprises a first rhythm light signal generating device 42 and a second rhythm light signal generating device 44. The first and second rhythm light signal generating device 42, 44 are configured as projectors and disposed side by side on the cabin ceiling in a region of the lintel 28 of the evacuation door 12 above the first and second information light signal generating device 24, 26 respectively. The first rhythm light signal generating device 42 generates a first rhythm light signal 46 by projecting an arrow-shaped object onto the cabin floor in front of the evacuation door 12. The second rhythm light signal generating device 44 generates a second rhythm light signal 48 similar to the first rhythm light signal 46 by projecting an arrow-shaped object onto the sill of the evacuation door 12.

The shape of the first rhythm light signal 46 is that of an arrow, which points in the direction of the course of the first escape route 18. The shape of the second rhythm light signal 48 is likewise that of an arrow, which points in the direction of the course of the second escape route 20. The first and second rhythm light signal 46, 48 are to be discerned separately from one another, i.e. they do not overlap one another. In the region of the cabin floor, onto which the first and second rhythm light signal 46, 48 are projected, luminous means are provided, which due to luminescence intensify the signal effect of the first and second rhythm light signal 46, 48.

As is represented in FIG. 5, the first and second rhythm light signal generating device 42, 44 are connected to the control device 34. The control device 34 is adapted to alter the intensity of the first and second rhythm light signal 46, 48 stroboscopically in a time rhythm. The time rhythm is adapted to a preset flow rate of persons to be evacuated via the first and second escape route 18, 20. A period of the rhythm lasts 0.5 seconds. Thus, the first rhythm light signal 46 lights up when a first person to be evacuated along the first escape route 18 is to step through the evacuation door 12. The first rhythm light signal 46 then goes out and remains so for a time interval that corresponds to the length of time that the first person to be evacuated takes or is to take to step through the evacuation door 12 and get onto the emergency chute 14. After this, the first rhythm light signal 46 lights up again in order to instruct a second person to be evacuated, who is following the first person to be evacuated, to step in turn through the evacuation door 12 and get onto the emergency chute 14. The same applies to the second rhythm light signal 48 for persons on the second escape route 20. Thus, some of the persons to be evacuated move in time to the rhythm of the first rhythm light signal 46 along the first escape route 18, while the other persons to be evacuated move in time to the rhythm of the second rhythm light signal 48 along the second escape route 20. The period of the rhythm of the first and second rhythm light signal 46, 48 is approximately 1.5 Hz.

The control device 34 is adapted such that the rhythms of the first and second rhythm light signal 46, 48 are tuned to one another in such a way that the intensities of the first and second rhythm light signal 46, 48 change asynchronously relative to one another. In other words, when the maximum light quantity of the first rhythm light signal 46 has been reached, the light quantity of the second rhythm light signal 48 is at its minimum. As a result, the persons to be evacuated use the first and second escape route 18, 20 according to the alternate merging method when stepping through the evacuation door 12.

As is represented in FIG. 1, the light signal generating device 16 further comprises a first marking light generating device 50 and a second marking light generating device 52. The first marking light generating device 50 generates a first marking light signal 54. The second marking light generating device generates a second marking light signal 56. The first and second marking light signal 54, 56 are displayed side by side in a region of the top end of the emergency chute. In this case, the first marking light signal 54 marks the point of the first escape route 18 on the emergency chute 14 that a person to be evacuated using the first escape route 18 is to head for upon leaving the evacuation door 12. The first marking light signal 54 therefore marks a landing point on the emergency chute 14 where a person to be evacuated using the first escape route 18 is ideally to land upon jumping down from the evacuation door 12 in order to guarantee rapid as well as problem-free, safe sliding of the person along the emergency chute 14 from the top end to the bottom end of the emergency chute 14. The same applies to the second marking light signal 56 for marking the second escape route 20 on the emergency chute 14.

For generating the first and second marking light signal 54, 56 the first and second marking light signal generating device 50, 52 comprise a plurality of series-connected light-emitting diodes that are incorporated into the emergency chute 14. The light-emitting diodes are arranged in rows that follow the course of three concentric circles of differing diameters. The first and second marking light signal 54, 56 therefore each take the form of a target. For better sighting of the first and second marking light signal 54, 56 the first and second marking light signal generating device 50, 52 each comprise additional luminescent or retro-reflecting luminous means, which are activated by means of the light generated by the light-emitting diodes.

Because the first and second marking light signal 54, 56 are mounted side by side on the emergency chute 14, a person to be evacuated is able to see clearly that the sliding surface 22 of the emergency chute 14 is subdivided into a first slideway 58 associated with the first escape route 18 and a second slideway 60 associated with the second escape route 20, which may be used independently of one another as chutes.

In FIG. 1 it is moreover evident that the light signal generating device 16 further comprises a dividing light signal generating device 62. The dividing light signal generating device generates a dividing light signal 64. The dividing light signal is emitted in the region of a dividing device 66, which divides the emergency chute 14 into the first slideway 58 and the second slideway 60 and extends substantially over the length of the emergency chute. In FIG. 1 the dividing device 66 is configured as a flexible fibre-optic conductor strip 68 that is connected to the emergency chute 14. Along the fibre-optic conductor strip 68 the dividing light signal generating device 62 is configured in the form of a continuous, diffusely reflecting coating 70. For generating the dividing light signal 64 the dividing light signal generating device 62 comprises spotlights 72 that illuminate the diffusely reflecting coating and hence bring about the diffusely reflected radiation of the diffusely reflecting strip 70. The spotlights 72 are disposed at regular intervals on support tubes 74 of the emergency chute 14 and point in the direction of the sliding surface 22.

Figure 3:
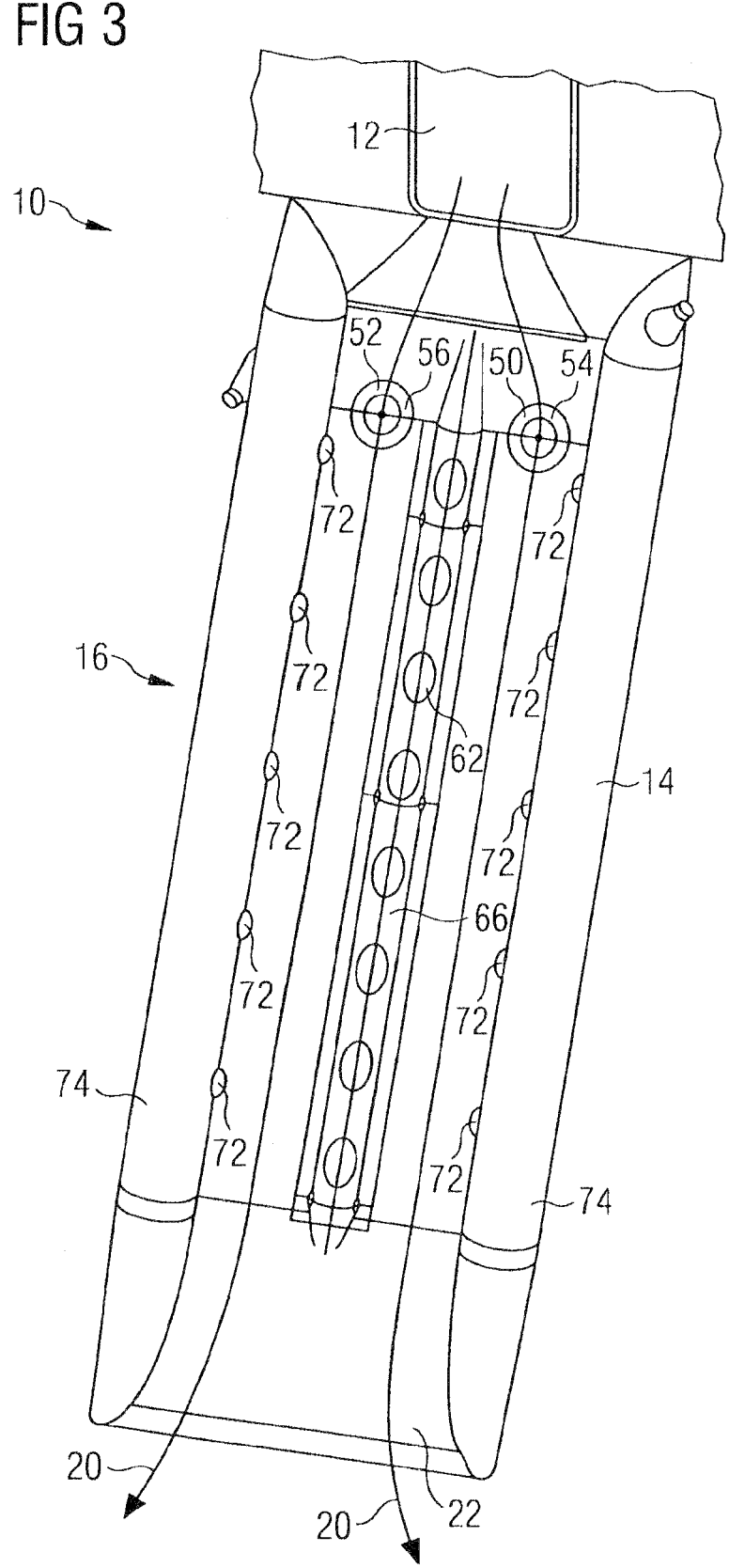

FIG. 3 shows a further embodiment of the dividing light signal generating device 62. Here, the dividing device 66 is configured in the form of a bead extending substantially along the centre line of the sliding surface 22. The dividing light signal generating device 62 is configured in the form of for example eight successive light-emitting luminous elements disposed substantially along the centre line of the sliding surface 22, wherein the luminous elements comprise light-emitting diodes and/or incandescent bulbs.

As shown in FIG. 1, the light signal generating device 16 further comprises a first exit light signal generating device 76 and a second exit light signal generating device 78. The first exit light signal generating device 76 generates a first exit light signal 80. The second exit light signal generating device 78 generates a second exit light signal 82. The first and second exit light signal generating device 76, 78 are configured in the form of two light-reflecting, arrow-shaped coatings that are disposed on a first and second post 84, 86 respectively. By illuminating the coatings with light from other light sources, such as for example by lighting from the cabin inner region through cabin windows or by light passing through the evacuation door, the first and second exit signal for a person to be evacuated may be seen as a result of light reflection on the first and second post respectively. It is however also conceivable that the first and second exit light signal 80, 82 are projected onto the corresponding posts 84, 86, and the first and second exit light signal generating device for this purpose are configured as at least one projector that is disposed in a region, which is not shown in detail in FIG. 1, of the evacuation door, the emergency chute or the fuselage. The first and second post 84, 86 are connected to the support tubes 74 of the emergency chute 14 and extend in a direction leading away from the emergency chute. In this case, the first and second post 84, 86 point away from the ground, on which the bottom end of the emergency chute 14 rests. The first and second post 84, 86 are inflatable and are inflated simultaneously with activation of the inflation mechanism of the emergency chute 14.

The first and second exit light signal generating device 76, 78 are disposed on the end of the first and/or second post 84, 86 remote from the emergency chute 14 and emit the exit light signals 80, 82 substantially counter to the direction of the first and/or second escape route 18, 20, so that a person to be evacuated before and during his movement along the emergency chute 14 receives a clear indication about the direction, in which he has to leave the emergency chute 14 and in which he then has to move.

Figure 2:
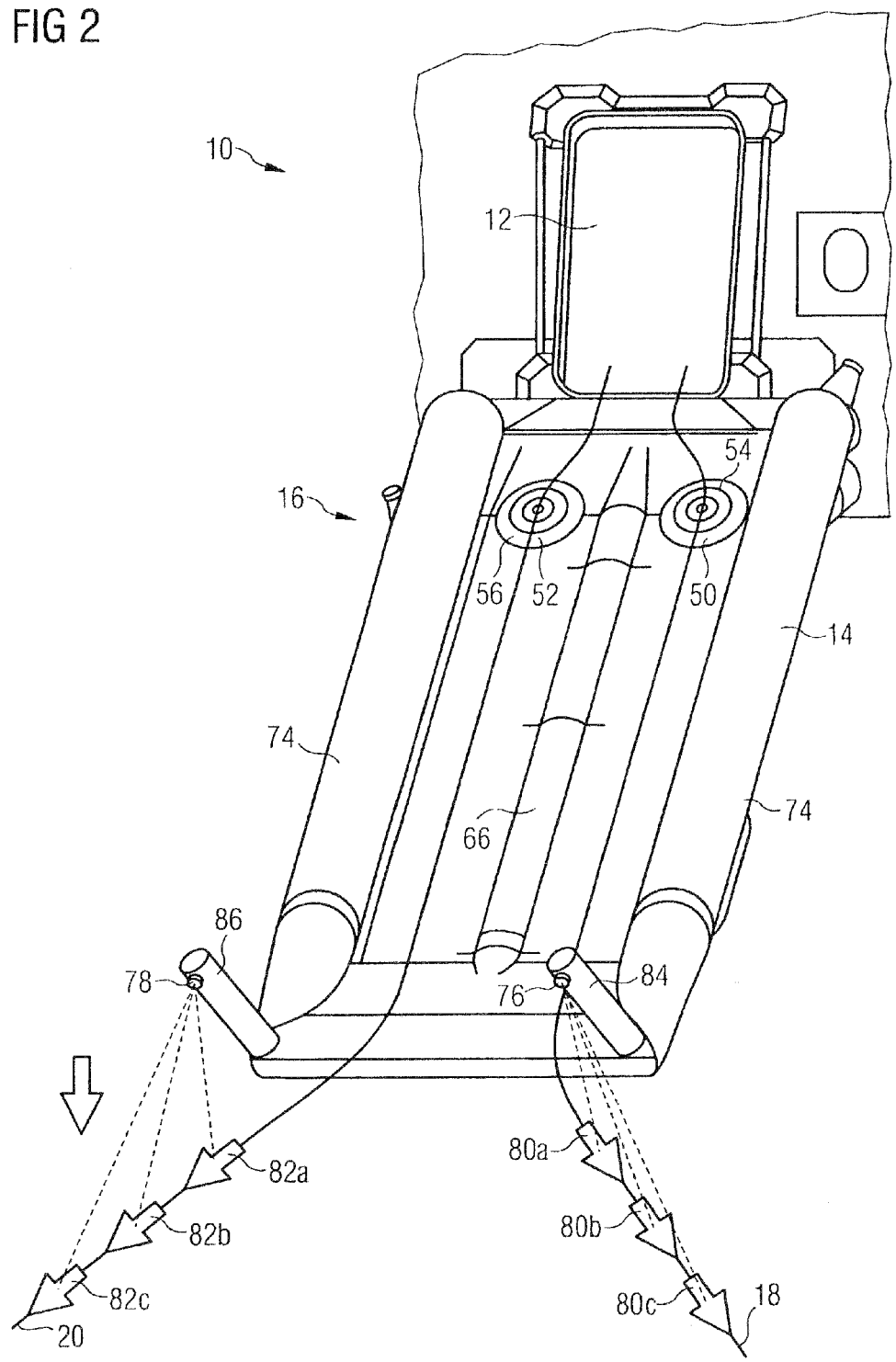

FIG. 2 shows a further embodiment of the first and second exit light signal generating device 76, 78. In this case, the first and second exit light signal generating device 76, 78 are configured as projectors. The first exit light signal generating device 76 generates a plurality of mutually offset first exit light signals 80*a*, 80*b*, 80*c* by projecting a plurality of arrow-shaped objects onto the ground, on which the bottom end of the emergency chute 14 rests. The second exit light signal generating device 78 generates a plurality of mutually offset second exit light signals 82*a*, 82*b*, 82*c* likewise by projecting a plurality of arrow-shaped objects onto the ground, on which the bottom end of the emergency chute 14 rests. The shapes of the first exit light signals 80*a*, 80*b*, 80*c* are those of arrows, which point in the direction of the course of the first escape route 18 and in a spatially offset sequence indicate the course of the first escape route 18. The shapes of the second exit light signals 82*a*, 82*b*, 82*c* are those of arrows, which point in the direction of the course of the second escape route 20 and in a spatially offset sequence indicate the course of the second escape route 20. The first and second exit light signal generating device 76, 78 emit the first and second exit light signal 80*a*, 80*b*, 80*c*, 82*a*, 82*b*, 82*c* substantially along the direction of the first and second escape route 18, 20 respectively, i.e. substantially along the direction of motion of a person sliding down the emergency chute 14, so that a person to be evacuated before and during his movement along the emergency chute 14 is not dazzled but, having arrived at the bottom end of the emergency chute 14, may clearly see the first and/or second exit light signals 80, 82 on the ground and hence detect the further course of the escape route. Furthermore, the first and second exit light signals 80*a*, 80*b*, 80*c*, 82*a*, 82*b*, 82*c* are generated in a time sequence one after the other or alternately one after the other. Thus, for example along the first escape route 18 initially the first exit light signal 80*a* is displayed, then the first exit light signal 80*b* and finally the first exit light signal 80*c*. This cycle then begins anew and so on. This produces for a person to be evacuated the impression of two arrows moving along the first and/or second escape route 18, 20. The first and second exit light signals 80*a*, 80*b*, 80*c*, 82*a*, 82*b*, 82*c* therefore generate a dynamic running light to assist the orientation and movement of a person to be evacuated in such a way that he moves quickly away from the emergency chute and the aircraft into a safe environment, without slowing down the flow rate or constituting a hazard danger or hindrance to other persons that are to be evacuated.

The invention claimed is:
1. A system for evacuating persons in a vehicle, comprising a light signal generator structured to emit at least one visual light signal that indicates at least one preset escape route for at least one person to be evacuated, wherein the light signal generator is structured to display a first light signal on a sliding surface of an emergency chute, via which a first escape route leads, wherein the first light signal has a form, which is configured to mark a first landing point on the sliding surface of the emergency chute, where a person is to land upon jumping on the emergency chute the emergency chute.

2. The system according to claim 1, wherein the light signal generator is structured to display the light signal in the form of an arrow, a target and/or a dotted line.

3. The system according to claim 1, wherein the light signal generator is structured to generate the light signal by converting electric power to light output.

4. The system according to claim 1, wherein the light signal generator is structured to generate the light signal on the basis of chemical luminescence.

5. The system according to claim 1, wherein the light signal generator is structured to generate the light signal by projecting at least one object or at least one object image onto an image plane.

6. The system according to claim 1, wherein the light signal generator comprises a control device structured to change at least one of the shape, colour, signal strength and output direction of the light signal in a time rhythm that is adjusted to a preset flow rate of persons to be evacuated via the escape route.

7. The system according to claim 1, wherein the light signal generator is structured to emit a light signal in the region of a dividing device structured to divide an emergency chute into a first slideway and a second slideway and to extend substantially over the length of the emergency chute.

8. The system according to claim 1, wherein the light signal generator is structured to display the first light signal further in a region of a lintel and/or a sill of an evacuation door, through which the first escape route leads, wherein the first light signal indicates a first direction that is adjusted to the direction of the course of the first escape route.

9. The system according to claim 1, wherein the light signal generator is structured to display a second light signal in at least one of:

a region of a lintel and/or a sill of an evacuation door, through which a second escape route leads, wherein the second light signal indicates a second direction that is adjusted to the direction of the course of the second escape route, a region of a top end of an emergency chute, via which a second escape route leads, wherein the second light signal indicates a second position that is adjusted to a preset second entry point of the emergency chute, and a region extending from the bottom end of the emergency chute in a direction leading away from the emergency chute, wherein the second light signal indicates a second direction that is adjusted to the direction of the course of the second escape route.

10. The system according to claim 9, wherein the light signal generator is structured to display the first light signal and the second light signal side by side, wherein the first escape route indicated by the first light signal and the escape route indicated by the second light signal lead through the same evacuation door and/or via the same emergency chute and are usable independently of one another.

11. The system according to claim 9, wherein the control device is further structured to change the intensities of the first and second light signal synchronously or asynchronously relative to one another.

12. The system according to claim 1, wherein the first light signal also marks a region extending from the bottom end of the emergency chute in a direction leading away from the emergency chute, wherein the light signal generating device is disposed in a region of the bottom end of the emergency chute and the first light signal has a form, which is adapted to indicate a first direction that points in the direction of the course of the first escape route.

* * * * *